United States Patent [19]

Kuwamura et al.

[11] Patent Number: 5,637,403
[45] Date of Patent: Jun. 10, 1997

[54] ORGANIC COMPOSITE-PLATED STEEL PLATE AND RESIN COMPOSITION FOR COATING MATERIAL USED THEREIN

[75] Inventors: Shin'ichi Kuwamura, Kitakatsuragi-gun; Atsushi Miyagaki, Izumiotsu; Kiyoshi Ohnishi, Sakai; Masahide Amemoto, Kaizuka; Hisao Odashima, Himeji; Keitaro Shibata, Himeji; Akihiro Kasuya, Himeji; Kiyoshi Ohmori, Himeji, all of Japan

[73] Assignees: Dainippon Ink and Chemicals, Inc.; Nippon Steel Corporation, both of Tokyo, Japan

[21] Appl. No.: 360,735

[22] PCT Filed: Apr. 22, 1994

[86] PCT No.: PCT/JP94/00674

§ 371 Date: Mar. 1, 1995

§ 102(e) Date: Mar. 1, 1995

[87] PCT Pub. No.: WO94/25639

PCT Pub. Date: Nov. 10, 1994

[30] Foreign Application Priority Data

Apr. 23, 1993 [JP] Japan .................. 5-097421

[51] Int. Cl.$^6$ ............................................ C23C 22/30
[52] U.S. Cl. ......................... 428/413; 428/472.1; 148/265
[58] Field of Search ............................ 428/413, 418, 428/472.1; 148/265, 251

[56] References Cited

U.S. PATENT DOCUMENTS 4,879,325  11/1989  Kimura .................................. 523/504
5,141,822   8/1992  Matsuo .................................. 428/623
5,334,455   8/1994  Noren ................................... 428/413
5,411,809   5/1995  Shalati .................................. 428/418

FOREIGN PATENT DOCUMENTS 2-263633  10/1990  Japan.

*Primary Examiner*—Sam Silverberg
*Attorney, Agent, or Firm*—Armstrong, Westerman, Hattori, McLeland & Naughton

[57] ABSTRACT

The present invention comprises an improved organic composite-plated steel plate which is obtained by applying a thermosetting resin to a chromate-coated alloy-plated steel plate and curing this, wherein, various aqueous resin compositions having the form of basic coating film formation components, such as, for example, aqueous vinyl modified epoxy ester resins, or aqueous vinyl modified epoxy ester resin/blocked isocyanate compound-types, or aqueous vinyl modified epoxy ester resin/blocked isocyanate compounds/colloidal silica-types, are used as the thermosetting resin described above. In accordance with the present invention, it is possible to provide an organic composite-plated steel plate which is novel and has extremely high applicability in a form in which an aqueous resin (composition) for organic composite coating, which has superior adhesion with adhesives, superior continuous welding properties, superior post-working corrosion resistance, and superior electro-deposition coating properties, and moreover, has superior coating material adhesion and corrosion resistance, and the coated surface of which, after electro-deposition coating, has particularly superior shininess (smoothness), and which furthermore has superior rust resistance and does not use large amounts of organic solvent, is pre-coated onto a metallic material.

8 Claims, No Drawings

ORGANIC COMPOSITE-PLATED STEEL PLATE AND RESIN COMPOSITION FOR COATING MATERIAL USED THEREIN

FIELD OF THE INVENTION

The present invention relates to an organic composite-plated steel plate which is novel and useful, as well as to a resin composition for coating material which is used in the coating thereof. In greater detail, the present invention relates to an organic composite-plated steel plate, which is obtained by applying a specified organic resin or a composition containing a specified organic resin to a specified chromate-coated plated steel plate and curing this, which has in particular superior adhesion with adhesives, superior continuous welding properties, superior post-working corrosion resistance, superior electro-deposition coating properties, superior high corrosion resistance, and superior coating material adhesion, as well as to a resin composition for coating materials.

In addition, it has been discovered that the mixture on the molecular level with the specified organic resin of a blocked isocyanate compound as a curing agent provides an organic composite-plated steel plate which has particularly superior rust resistance; the present invention provides an organic composite-plated steel plate having such a specified form.

BACKGROUND ART

As a result of problems associated with organic solvents constituting in coating materials, such as the combustibility thereof, atmospheric pollution, worker safety, and sanitation problems, it has been hoped a rapid shift from organic-solvent-based coating materials to water-based coating materials.

On the other hand, in the field of automobiles, steel household items, and household electrical appliances, the use of pre-coated metal materials has been increasing in order to improve productivity.

Accordingly, in the field of surface preparation and coating, as well, in order to respond to such demands, various coating material compositions for use in pre-coated metal materials have been developed; however, in this field, as well, the shift from conventional organic-solvent-based coating materials to water-based coating materials is strongly desired.

Furthermore, in systems employing conventional organic-solvent-based coating materials, in order to obtain the conductivity which is a necessary condition for conducting an electro-deposition coating, the inventions disclosed in, for example, Japanese Patent Application, Second Publication, No. Sho 45-2430 and Japanese Patent Application, Second Publication, No. Hei 4-6882, disclose zinc-rich coating materials. Such zinc-rich coating materials are capable of electro-deposition coating; however, the smoothness of the coated surface is insufficient. Furthermore, in such zinc-rich coating materials, the coating film is unstable with respect to rust produced in the case in which corrosion occurs, and it is impossible to guarantee corrosion resistance over a long period of time (resistance to rust cannot be guaranteed), and moreover, after working, the coating film is easily fractured, and thus the resistance to corrosion after working is poor.

On the other hand, the inventions disclosed in Japanese Patent Application, Second Publication, No. Sho 52-44569, Japanese Patent Application, Second Publication, No. Sho 58-19706, and Japanese Patent Application, First Publication, Laid-Open No. Sho 51-79138 and Japanese Patent Application, First Publication, Laid Open No. Sho 58-138758 provide coating materials having a form into which conductive pigment is blended in order to make electro-deposition coating possible.

However, in such coating materials, particulate pigment possessing a relatively large particle diameter, wherein the average particle diameter is 1 micron ($\mu$m) or more, such as metallic powders of zinc, metallic carbide powders, or metallic phosphate powders, are employed as the conductive pigment. For this reason, unevenness is produced on the coating film which is formed, or, during press working, flaws resulting from the conductive materials which are added are deposited on the surface of the steel plate, and such unevenness or flaws remain on the surface of the electro-deposited coating, and as a result, even after two or three coats, there is a problem in that such unevennesses or flaws remain on the coating film surface, and there is a disadvantage in that, as a result thereof, it is also impossible to guarantee rust resistance.

Furthermore, in Japanese Patent Application, First Publication, Laid Open No. Sho 58-224174, Japanese Patent Application, First Publication, Laid Open No. Sho 60-197778, Japanese Patent Application, First Publication, Laid Open No. Sho 60-199074, and Japanese Patent Application, First Publication, Laid Open No. Sho 60-174879, inventions relating to organic composite silicate coating films and steel plates coated with such coating films are disclosed. These organic silicate coating films do not contain conductive pigments and are extremely thin coating films having a thickness within a range of 0.2~5.0 microns ($\mu$m), and possess high corrosion resistance as a result of bonds between an organic binder and colloidal silica, so that such coating films represent a noticeable improvement, particularly in press workabilities.

However, the problem of unevenness in the electro-deposited coating film is present, and in particular, there is a problem in that the coating film thickness of the electro-deposited coating film formed on the organic composite silicate coating film varies greatly in correspondence with the variation in the thickness of the organic composite silicate coating film. That is to say, in places in which the organic composite silicate coating film is thick, the electro-deposited coating film becomes thick, while in place where the coating film is thin, the electro-deposited coating film becomes thin. Accordingly, there is a problem in that as a result of the electro-deposited coating film, those unevennesses are magnified. Additionally, all of these organic composite silicate coating films exhibit a tendency to have poor rust resistance.

Furthermore, the problems described above were solved to a considerable extent by means of methods disclosed in Japanese Patent Application, First Publication, Laid Open No. Sho 62-283161, and Japanese Patent Application, First Publication, Laid Open No. Hei 3-269067; however, these methods possess problems. That is to say, in these methods, the use of a special organic solvent, or the use of special additives, was necessary, and there was a problem in that the adhesion thereof with adhesives such as vinyl chloride sol or the like is poor, and in addition, the electro-deposited coating film lacks a sense of glossiness, that is to say, the coating film is not shiny, and the smoothness thereof is insufficient. In addition, since it is necessary to apply an extremely thin coating film, it is necessary to sufficiently dilute the coating material which is used, and in order to do this, it is necessary to employ a large amount of organic solvent.

In view of the problems and defects present in the conventional technology, the present inventors began research in order to obtain an organic composite-plated steel plate which did not have the problems described above and was novel and possessed great usefulness.

That is to say, the present invention has as an object thereof to provide an organic composite-plated steel plate which is novel and possesses great usefulness, is in a form in which an aqueous resin for organic composite coating which, in particular, has superior adhesion with adhesives, has superior continuous weldabilities, has superior resistance to corrosion after working, and superior electro-deposition coating, and moreover, has superior coating material adhesion and resistance to corrosion, and in particular, the coated surface of which has superior shininess (smoothness) after electro-deposition coating, and furthermore, which has superior rust resistance and the like, and which additionally does not employ large amounts of organic solvent, is pre-coated on a steal material.

DISCLOSURE OF THE INVENTION

The improved organic composite-plated steel plate in accordance with claim 1 of the present invention is an organic composite-plated steel plate obtained by applying a thermosetting resin to a chromate-coated alloy plated steel plate and curing the thermosetting resin, wherein as the thermosetting resin described above, an aqueous resin composition is employed which contains, as a necessary coating film formation component, an aqueous vinyl modified epoxy ester resin obtained by modifying an epoxy ester resin, obtained by the reaction of an aromatic epoxy resin and a fatty acid, by means of the addition reaction of a vinyl monomer having an ethylenic vinyl monomer containing a carboxylic group as a necessary component, and neutralizing the modified epoxy ester resin using a basic compound.

Furthermore, the improved organic composite-plated steel plate in accordance with claim 2 of the present invention is an organic composite-plated steel plate which is obtained by applying a thermosetting resin to a chromate-coated alloy plated steel plate and curing the thermosetting resin, wherein as the thermosetting resin described above, an aqueous resin composition is employed which comprises a curing agent and an aqueous vinyl modified epoxy ester resin which is obtained by modifying an epoxy ester resin, which is obtained by the reaction of an aromatic epoxy resin and a fatty acid, by means of the addition reaction of a vinyl monomer having as a necessary component thereof an ethylenic vinyl monomer containing a carboxylic group, and a neutralization of the modified epoxy ester resin using a basic compound.

Furthermore, the improved organic composite-plated steel plate in accordance with claim 3 of the present invention is an organic composite-plated steel plate which is obtained by applying a thermosetting resin to a chromate-coated alloy plated steel plate and curing the thermosetting resin, wherein as the thermosetting resin described above, an aqueous resin composition is employed which comprises an aqueous vinyl modified epoxy ester resin obtained by modifying an epoxy ester resin, obtained by a reaction of an aromatic epoxy resin and a fatty acid, by means of an addition reaction of a vinyl monomer having as a necessary component thereof an ethylenic vinyl monomer containing a carboxylic group, and the neutralization of the modified epoxy ester resin using a basic compound, and at least one selected from the group consisting of a powder and a colloid (sol) comprising at least one of $SiO_2$, $Cr_2O_3$, $Fe_2O_3$, $Fe_3O_4$, MgO, $ZrO_2$, $SnO_2$, $Al_2O_3$, and $Sb_2O_5$.

Furthermore, the improved organic composite-plated steel plate in accordance with claim 4 of the present invention is an organic composite-plated steel plate which is obtained by applying a thermosetting resin to a chromate-coated alloy-plated steel plate and curing the thermosetting resin, wherein as the thermosetting resin described above, an aqueous resin composition is employed which comprises an aqueous vinyl modified epoxy ester resin obtained by modifying an epoxy ester resin, obtained by a reaction of an aromatic epoxy resin and a fatty acid, by means of an addition reaction of a vinyl monomer having as a necessary component thereof an ethylenic vinyl monomer containing a carboxylic group, and a neutralization of the modified epoxy ester resin using a basic compound, a curing agent for the aqueous vinyl modified epoxy ester resin, and at least one selected from the group consisting of a powder and a colloid (sol) comprising at least one of $SiO_2$, $Cr_2O_3$, $Fe_2O_3$, $Fe_3O_4$, MgO, $ZrO_2$, $SnO_2$, $Al_2O_3$, and $Sb_2O_5$.

The improved organic composite-plated steel plate in accordance with one of claims 1 through 4 has, in particular, superior adhesion with an adhesive, superior continuous weldabilities, superior resistance to corrosive properties after working, and superior electro-deposition coating properties, and moreover, has superior coating material adhesion and resistance to corrosion, and in particular, has superior shininess (smoothness) of the coated surface after electro-deposition coating.

Furthermore, when an aqueous resin composition in which a blocked isocyanate compound and a vinyl modified epoxy ester resin are mixed homogeneously on the molecular level is used in place of the aqueous vinyl modified epoxy ester resin and curing agent therefor, then there is an advantage in that an organic composite-plated steel plate is obtained which has particularly superior rust-resistance.

BEST MODE FOR THE EXECUTION OF THE INVENTION

As described above, the present inventors have conducted diligent research in order to solve the problems described above, and as a result, have arrived at the present invention.

That is to say, fundamentally, the present invention provides, respectively:

(1) an improved organic composite chromate-coated alloy-plated steel plate formed by using an aqueous resin composition containing, as a necessary coating film formation component, an aqueous vinyl modified epoxy ester resin, which is obtained by modifying an epoxy ester resin, obtained by the reaction of an aromatic epoxy resin and a fatty acid, by means of the addition reaction of a vinyl monomer having as a necessary component thereof an ethylenic vinyl monomer containing a carboxylic group, and neutralizing the modified epoxy ester resin using a basic compound;

(2) an improved organic composite chromate coated alloy plated steel plate formed by using an aqueous resin composition comprising a curing agent and an aqueous vinyl modified epoxy ester resin obtained by modifying an epoxy ester resin, obtained by the reaction of an aromatic epoxy resin and a fatty acid, by means of the addition reaction of a vinyl monomer having as a necessary component thereof an ethylenic vinyl monomer containing a carboxylic group, and neutralizing the modified epoxy ester resin using a basic compound;

(3) an improved organic composite chromate-coated alloy-plated steel plate formed by using an aqueous resin composition comprising an aqueous vinyl modified epoxy ester resin obtained by modifying an epoxy ester resin, obtained by a reaction of an aromatic epoxy resin and a fatty acid, by means of an addition reaction of a vinyl monomer having as an essential component thereof an ethylenic vinyl monomer containing a carboxylic group, and a neutralization of the modified epoxy ester resin using a basic compound, and at least one selected from the group consisting of a powder and a colloid (sol) comprising at least one of $SiO_2$, $Cr_2O_3$, $Fe_2O_3$, $Fe_3O_4$, MgO, $ZrO_2$, $SnO_2$, $Al_2O_3$, or $Sb_2O_5$; and (4) an improved organic composite chromate-coated alloy-plated steel plate formed by using an aqueous resin composition comprising an aqueous vinyl modified epoxy ester resin obtained by modifying an epoxy ester resin, obtained by a reaction of an aromatic epoxy resin and a fatty acid, by means of an addition reaction of a vinyl monomer having as an essential component thereof an ethylenic vinyl monomer containing a carboxylic group, and a neutralization of the modified epoxy ester resin using a basic compound, a curing agent for the aqueous vinyl modified epoxy ester resin, and at least one selected from the group consisting of a powder and a colloid (sol) comprising at least of $SiO_2$, $Cr_2O_3$, $Fe_2O_3$, $Fe_3O_4$, MgO, $ZrO_2$, $SnO_2$, $Al_2O_3$, and $Sb_2O_5$; and furthermore, the present invention provides:

a resin composition for coating material for chromate-coated alloy-plated steel plates, comprising an aqueous vinyl modified epoxy ester resin (A-1), obtained by the modifying of an epoxy ester resin, obtained by a reaction of an aromatic epoxy resin and a fatty acid, by means of an addition reaction of a vinyl monomer having as a necessary component thereof an ethylenic vinyl monomer possessing a carboxylic group, and a neutralization of the modified epoxy ester resin using a basic compound, at least one selected from the group consisting of a powder and a colloid (sol) (B) comprising at least one of $SiO_2$, $Cr_2O_3$, $Fe_2O_3$, $Fe_3O_4$, MgO, $ZrO_2$, $SnO_2$, $Al_2O_3$, and $Sb_2O_5$, a curing agent (C), and if necessary, a pigment composition (D); and furthermore, a resin composition for coating materials for chromate-coated alloy-plated steel plates comprising an aqueous vinyl modified epoxy ester resin (A-2) containing a blocked isocyanate compound obtained by mixing homogeneously on the molecular level so as to be aqueous, a blocked isocyanate compound and a vinyl modified epoxy ester resin, in which an epoxy ester resin, obtained by the reaction of an aromatic epoxy resin and a fatty acid, is modified, by means of the addition reaction of a vinyl monomer having as a necessary component an ethylenic vinyl monomer containing a carboxylic group, at least one selected from the group consisting of a powder and a colloid (sol) (B) comprising at least one of $SiO_2$, $Cr_2O_3$, $Fe_2O_3$, $Fe_3O_4$, MgO, $ZrO_2$, $SnO_2$, $Al_2O_3$, and $Sb_2O_5$, if necessary, a curing agent (C), and if necessary, a pigment (D).

(5) In addition, the present invention provides an improved organic composite chromate-coated alloy-plated steel plate employing, concretely, a specified resin composition in a form in which the aqueous vinyl modified epoxy ester resin and curing agent therefor are obtained by homogeneously mixing, on the molecular level, a vinyl modified epoxy ester resin and a blocked isocyanate compound, so as to be aqueous.

The present invention also provides an organic composite-plated steel plate which is obtained by applying the various aqueous resin compositions in (1)~(5) above, and curing these; the organic coating film thickness thereof is within a range of 0.2~3.0 $g/m^2$.

What is meant by the "chromate-coated alloy-plated steel plate" in the present invention is a plated steel plate which is further coated with a chromate coating film on a surface thereof, wherein the plated steel plate is plated with either various single elements (metallic single substance) such as Zn, Ni, Cu, Sn, Co, or Al, or various alloys, for example, Zn-Ni alloy, Zn-Fe alloy, Zn-Cr alloy, Zn-Cu alloy, Zn-Mn alloy, Zn-Al alloy, Zn-Mg alloy, or Zn-Cr-Nifl alloy.

Among these, Zn or Sn, or a Zn alloy, are appropriate for use as the plating substance, and more preferably, Zn or a Zn alloy are appropriate.

Here, what is meant by a "chromate coating film" is a chromium passivated coating film comprising a composite having trivalent and hexavalent chromium hydroxides as main components, in a form obtained by coating electrolytic-type chromate, applied-type chromate, or reactive-type chromate, and drying and curing this.

Furthermore, herein, an amount of deposited chromium of the chromane coating film within a range of 10 to 150 $mg/m^2$ is appropriate. When the amount of deposited chromium is less than 10 $mg/m^2$, it tends to become impossible to form an organic coating film having superior adhesion, and moreover, there is a tendency for corrosion resistance to decline as well, while on the other hand, at excessive levels of more than 150 $mg/m^2$, cohesion breakdowns of the chromate coating film occur, so that in particular, there is a tendency for the adhesion of the coating material or the like to decline.

The present invention can be executed by applying and curing an aqueous resin composition containing, as a necessary coating film formation component, an aqueous vinyl modified epoxy ester resin having a specified composition, which is explained hereinbelow, on this type of chromate-coated alloy-plated steel plate.

What is meant by such an "aqueous vinyl modified epoxy ester resin" is, for example, a resin which is obtained by means of the procedures described hereinbelow.

That is to say, first, an aromatic epoxy resin and a fatty acid are subjected to an esterification reaction for a period within a range of approximately 2 hours to approximately 10 hours at a temperature within a range of approximately 150° to 250° C., while being heated and agitated, and this is then dissolved using a desired organic solvent. A polymerization initiator and vinyl monomers having as a necessary component thereof an ethylenic vinyl monomer containing a carboxylic group are added, this is heated and agitated, and a graft reaction is conducted at a temperature within a range of from approximately 50° C. to approximately 150° C., and a vinyl modified epoxy ester resin is obtained.

Next, the carboxylic group of the vinyl modified epoxy ester resin obtained in this manner is neutralized using a basic compound, and after this, this is dispersed in water, and thus the aqueous vinyl modified epoxy ester resin is obtained.

Particularly representative examples of the aromatic epoxy resin which is used here include, for example, bisphenol A-type epoxy resin, bisphenol F-type epoxy resin, or novolak-type epoxy resin, or the like.

It is necessary that the number-average molecular weight of such aromatic epoxy resins be within a range of approximately 800 to 6000. When the number-average molecular weight is less than 800, the corrosion resistance is poor, while when the number of the molecular weight is more than 6000, the resin tends to be highly viscous when synthesized, and such a resin is thus difficult to use.

Particularly representative examples of commercially available aromatic epoxy resins include, for example, the "EPICOAT 152, 154, 1001, 1002, 1004, 1007, 1009, and 1010" (trade names) of Shell Co., in Royal Dutch, and the "EPICLON 1050, 1055, 4050, 3050, 7050, and 9055" (trade names) of Dainippon Ink and Chemicals, Inc., and the like; it is of course possible to be used singly or in a combination of two or more.

In the present invention, the aromatic epoxy resin is employed as a necessary component particularly in order to maintain corrosion resistance and in order to maintain the adhesion to the substrate, the electro-deposited coating film, or the adhesive such as vinyl chloride sol.

The amount of this aromatic epoxy resin which is employed preferably be within a range of approximately 5 to 80 weight percent. When the amount thereof used is less than 5 weight percent, the effects described above are small, while when the amount used is in excess of 80 weight percent, the resin design becomes difficult. An amount within a range of, approximately, 10 to 60 weight percent is more preferable from the point of view of continuous weldabilities.

Next, the use of a drying oil fatty acid as the fatty acid described above is desirable in order to guarantee the grafting point during the following so-called "vinyl modifying". When a non-drying oil fatty acid is employed, it is necessary to guarantee the grafting point by means of adding a small amount of one of the various unsaturated dicarboxylic acids or the like, such as maleic acid, fumaric acid, or iraconic acid.

Particularly representative examples of fatty acids which can be employed include, for example, linseed oil fatty acid, soybean oil fatty acid, safflower oil fatty acid, rapeseed oil fatty acid, sesame seed oil fatty acid, coconut oil fatty acid, palm oil fatty acid, palm kernel oil fatty acid, rice oil fatty acid, castor oil fatty acid, dehydrated castor oil fatty acid, and the like. The amount of fatty acid employed should be such that the sum of the fatty acid and the aromatic epoxy resin described above reach 100 weight percent.

During the esterification reaction, it is possible to use, as the reaction catalyst, various basic substances such as one of the various imidazole derivatives such as 2-methylimidazole, or the like; one of the various tertiary amines such as triethyl amine or dimethylbenzyl amine; or one of the various quaternary amines such as tetramethyl ammonium chloride. Furthermore, in order to remove the water generated by the condensation, this esterification reaction may be conducted under refluxing condition with toluene or xylene or the like.

Particularly representative examples of the organic solvent which is used during the vinyl modifying include, for example, various hydrophobic organic solvents such as toluene, xylene, or mineral spirits; various alcohol-type solvents such as methanol, ethanol, or butanol; various ether-type solvents such as methyl ether, ethyl ether, or tetrahydrofuran; various ketone-type solvents such as acetone, methyl ethyl ketone, methyl isobutyl ketone, or cyclohexanone; various ethylene glycol-type solvents such as ethyl cellosolve, butyl cellosolve, or cellosolve acetate; various propylene glycol-type solvents such as propylene glycol monobutyl ether; various diethylene glycol-type solvents such as butyl carbitol, and the like; furthermore, it is also possible to use commonly-known hydrophilic organic solvents, such as N-methyl-2-pyrolidone, dimethyl formamide, dimethyl acetoamide, or dimethyl sulfoxide or the like, in freely selected proportions.

Hydrophobic organic solvents have poor dispersion stability with respect to water (aqueous dispersion stability), so that it is desirable to employ a hydrophilic organic solvent, and furthermore, the amount used is not particularly restricted; however, the amount employed is generally such that the resin solid component is within a range of approximately 5 to 80 weight percent.

Particularly representative examples of the polymerization initiator described above which is employed during vinyl modifying include, for example, various inorganic peroxide compounds such as potassium persulfate, ammonium persulfate, hydrogen peroxide, or percarbonate salt, or the like; or various organic peroxides such as various ketone peroxides such as methyl ethyl ketone peroxide or the like; various peroxyketols such as 1,1-bis(tert-butylperoxy)-3,3, 5-trimethyl cyclohexanone, and the like; various hydroperoxides such as tert-butylhydroperoxide, and the like; various diacyl peroxides such as benzoyl peroxide; various dialkyl peroxides such as di-tert-butyl peroxide, and the like; various peroxydicarbonates such as dioxypropyl peroxydicarbonate, and the like; and various peroxy esters such as tert-butyl peroxy-2-ethyl hexanoate; or, various azo-type compounds such as azobisisobutylonitrile.

Furthermore, with respect to the vinyl monomer employed, an ethylenic vinyl monomer containing a carboxyl group must be used as a necessary component for the purpose of making this aqueous form, which is accomplished in the following process. Furthermore, in the case in which a curing agent is concomitantly used, in order to ensure sufficient curability, the use of an ethylenic vinyl monomer containing a hydroxyl group is also preferable.

Particularly representative examples of the ethylenic vinyl monomer containing a carboxylic group include, for example, various unsaturated mono- or di-carboxylic acids such as acrylic acid, methacrylic acid, crotonic acid, itaconic acid, fumaric acid, maleic acid, or citraconic acid, or the like.

Furthermore, particularly representative examples of the ethylenic vinyl monomer containing a hydroxyl group include, for example, 2-hydroxy ethyl methacrylate, 2-hydroxy ethyl acrylate, 2-hydroxy propyl methacrylate, 2-hydroxy propyl acrylate, or the like. It is of course the case that these may be used alone, or two or more thereof may be used concomitantly.

In addition to these ethylenic vinyl monomers containing carboxyl groups and ethylenic vinyl monomers containing hydroxyl groups, if necessary, it is possible to use another ethylenic vinyl monomer which is polymerizable with ethylenic vinyl monomers containing these functional groups.

Particularly representative ethylenic vinyl monomers which may be employed include, for example, various (meth)acrylate alkyl esters such as (meth)acrylate methyl, (meth)acrylate ethyl, (meth)acrylate n-butyl, or (meth) acrylate lauryl; various α- or β-unsaturated amides, such as acryl amide, methacryl amide, or N-methylolacrylamide; various β- or β-unsaturated nitriles such as acrylonitrile or methacrylonitrile; various styrene derivatives such as styrene, α-methylstyrene or vinyl toluene; or various vinyl esters such as vinyl acetate, vinyl propionate, or "Veoba" (trade name; a vinyl ester of a branched aliphatic monocarboxylic acid produced by Shell Co., in Royal Dutch); furthermore, various halogenated vinyls such as vinyl chloride, vinylidene chloride, or other fluorine-containing monomers; or various conjugated dienes such as butadiene.

It is of course the case that these monomers may be used singly, or two or more thereof may be used concomitantly. It is also the case that other polymerizable polyester resins or alkyd resins may be used concomitantly.

With respect to the amount of use of the ethylenic vinyl monomers described above, an amount within a range of approximately 3 to 50 parts per weight with respect to 100 parts per weight of the reaction product of the aromatic epoxy resin and fatty acid described above is appropriate, and a reaction may be carried out using these proportions.

Here, with respect to the amount of use of the ethylenic vinyl monomer containing a carboxylic group which is the necessary component described above, an amount within a range of, approximately, 3 to 30 parts is appropriate. In the case when the amount used is less than approximately 3 parts, the particle diameter of the aqueous dispersion which is finally obtained tends to become large, and as a result, the sedimentation stability becomes poor, and application becomes difficult, while on the other hand, when the amount used is in excess of approximately 30 parts, after this is entirely neutralized using a basic compound, it does not become an aqueous dispersion, but rather becomes completely water soluble. In this case, when the degree of neutralization is reduced, an aqueous dispersion is obtainable; however, there is a tendency in all cases for this to dissolve in alkaline substances, so that an organic coating film which is deficient particularly in alkaline resistance is obtained.

Particularly representative examples of the basic compound described above, which is employed in order to neutralize the carboxylic group present in the resin when the reaction product is made aqueous in an aqueous medium include, for example, ammonia, volatile amines or the like, and the use of such volatile substances is preferable.

In addition, inorganic basic compounds except for ammonia exhibit a tendency to remain in a coating film, and to reduce, in particular, the water resistance thereof, so that the use thereof is not preferable.

Particularly representative examples of such volatile amines include, for example, at least one selected from a group consisting of various amines comprising monomethyl amine, dimethyl amine, trimethyl amine, monoethyl amine, diethyl amine, triethyl amine, monopropyl amine, dimethyl propyl amine, monoethanol amine, diethanol amine, triethanol amine, N-methyl ethanol amine, N-aminoethyl ethanol amine, N-methyl diethanol amine, monoisopropanol amine, diisopropanol amine, triisopropanol amine, and N,N-dimethyl propanol amine, and the like.

It may be conducted to make aqueous by neutralizing a portion or all of the carboxylic groups present in the reaction products using the basic substance, and then, dispersing the reaction products in water.

With regard to the method of dispersing the neutralized product of the reaction products in water, while agitating the neutralized product, water may be added gradually thereinto and this subjected to a phase-inversion emulsification, or the reaction products may be added into a sufficiently agitated water.

A method may also be adopted in which dispersion in water is conducted while applying mechanical shearing force by means of a homogenizer, colloid mill, static mixer, or mantongori. Furthermore, while dispersion in water is conducting, a method in which ultrasonic is applied is also preferable.

In this manner, it is possible to prepare the aqueous vinyl modified epoxy ester resin which is a necessary component in the aqueous resin composition employed in the present invention.

With respect to the aqueous resin composition employed in the present invention, it is possible to concomitantly use a composition which contains, in addition to the aqueous vinyl modified epoxy ester resin, if necessary, a curing agent which is used in order to cure the aqueous vinyl modified epoxy ester resin, and/or a powder or a colloid (sol) of a specified metal oxide which serves to improve the corrosion resistance.

Among these, the use of a curing agent is particularly effective in improving the resistance to solvents and the alkaline resistance.

Particularly representative examples of curing agents to be employed include, for example, amino resins, blocked isocyanate compounds, dryer agents, epoxy compounds, or aziridine compounds or the like. No particular restriction is made with respect to the type thereof, but among the above, the use of amino resins, blocked isocyanate compounds, or dryer agents, which possess superior storage stability in an aqueous medium with the vinyl modified epoxy ester resin described above, is usual.

Particularly representative examples of amino resins include, for example, various butyl etherified melamine resins, such as "SUPER BECKAMIN J-820-60, G-821-60, or L-128-60" (trade names; produced by Dainippon Ink and Chemicals, Inc.); or various butyl etherified urea resins, such as "BECKAMIN G-1850 or G-196-60" (trade names; produced by Dainippon Ink and Chemicals, Inc.), and the like; and furthermore, various methyl etherified melamine resins, such as "CYMEL 300, 303, or 325" (trade names; produced by Mitsui SciTech), and the like; such commercially available products may be employed.

Particularly representative examples of blocked isocyanate compounds include, for example, both aqueous blocked isocyanate compounds and non-aqueous blocked isocyanate compounds; however, when non-aqueous blocked isocyanate compounds are employed, if the blocked isocyanate compounds are added to the coating material immediately prior to use and strongly agitated, then the stability thereof worsens, and there are cases in which sedimentation occurs, so that with respect to this point, the use of aqueous blocked isocyanate compounds is desirable.

Particularly representative examples of blocked isocyanate compounds which may be employed include, for example, as the blocking agent of the isocyanate group, for example, various alcohols such as methanol, ethanol, n-propanol, iso-propanol, n-butanol, iso-butanol, and the like; various phenols such as phenol, cresol, nitrophenol, chlorophenol, resorcinol, or the like; various thiokols such as benzene thiol, and the like; various caprolactums such as ε-caprolactum; various carbamates such as ethyl carbamate; various keto-enols such as acetyl acetone; various ketoximes such as methyl ethyl ketoximes or various block agents (blocking agents) such as sodium hydrogen sulfide (sodium bisulfite), or the like;

using these, various isocyanate compounds such as hexamethylene diisocyanate, isophorone diisocyanate, tolylene diisocyanate, xylylene diisocyanate or diphenyl methane diisocyanate, or the like, or prepolymers thereof, are reacted at a temperature within a range of approximately 30° C.~100° C. in the absence of a catalyst, or in the presence of a catalyst such as dibutyl tin dilaurylate, and the isocyanate groups are thus blocked; a compound having such a form may be employed.

Furthermore, particularly representative examples of dryer agents which may be employed include, for example, various aliphatic carboxylic acids such as oleic acid and the like; and various metallic soaps, such as soaps using cobalt salt, manganese salt, zirconium salt, calcium salt, iron salt, or lead salt or the other salt of various aliphatic carboxylic acids such as oleic acid and the like, and of various alicyclic carboxylic acids such as naphthenic acid or the like which is used as a carrier, or dryer agents in which an anionic emulsifier, a cationic emulsifier, or a non-ionic emulsifier is added to one of the metallic soaps described above in order to make aqueous; it is of course the case that these may be used singly or in combinations of two or more thereof.

With respect to the amount of metallic soap and substance which makes this aqueous which are added, with respect to the metallic component, a range of 0.003 to 0.5 weight percent is appropriate; when the amount added is less than 0.003 weight percent, it is difficult to produce the desired effect, while when the metallic component thereof exceeds 0.5 weight percent, there is a problem in that especially the water resistance is worsened, so that neither of these cases is preferable, and the preferable amount of use is appropriately from 0.05 to 0.4 weight percent as the metallic component.

Additional examples of the curing agent include various tertiary amines such as dimethyl aniline, diethyl aniline, or dimethyl paratoluidine or the like.

With respect to the amount used of the curing agent, excluding the case of the dryer agent described above, a proportion within a range of approximately 1 part per weight to 50 parts per weight with respect to 100 parts per weight of the aqueous vinyl modified epoxy ester resin, calculated on the basis of solid component of the aqueous vinyl modified epoxy ester resin, is appropriate, and an amount within this range preferably be employed.

Particularly representative examples of the powder or colloid (sol) of the metallic oxide include powders or colloids (sols) of $SiO_2$, $Cr_2O_3$, $Fe_2O_3$, $Fe_3O_4$, $MgO$, $ZrO_2$, $SnO_2$, $Al_2O_3$, or $Sb_2O_5$, having a particle diameter within a range of 1 to 15 nanometers (nm), and it is possible to use one or two or more thereof.

With respect to the amount used of the powder or colloid (sol) of the metallic oxide, an amount within a range of approximately 10 parts per weight to 100 parts per weight with respect to 100 parts per weight of the resin, in solid component of the aqueous vinyl modified epoxy ester resin, is appropriate, and an amount within this range preferable be employed.

By means of adding the metallic oxide in a colloid form, an organic composite-plated steel plate in which the corrosion resistance is markedly increased without a reduction in the shininess thereof after electro-deposition coating, or a reduction in the adhesion of the coating material, can be obtained.

In the present invention, a resin composition for coating material for a chromate-coated alloy-plated steel plate which is preferably employed comprises:

100 parts per weight of the solid component (hereinbelow identical) of an aqueous vinyl modified epoxy ester resin (A-1) which is obtained by modifying an epoxy ester resin, which is obtained by reacting an aromatic epoxy ester resin and a fatty acid, by means of an addition reaction with a vinyl monomer having as an essential component thereof an ethylenic vinyl monomer containing a carboxylic group, and neutralizing the modified epoxy ester resin using a basic compound;

approximately 10 parts per weight to 100 parts per weight of at least one powder or colloid (sol) (B) of $SiO_2$, $Cr_2O_3$, $Fe_2O_3$, $Fe_3O_4$, $MgO$, $ZrO_2$, $SnO_2$, $Al_2O_3$, or $Sb_2O_5$, approximately 1 part per weight to 50 parts per weight of a curing agent (C); and where necessary, 0 to approximately 50 parts per weight of a pigment (D).

Furthermore, in the present invention, in the case in which an aqueous resin composition is used which is obtained by, in place of the aqueous vinyl modified epoxy ester resin and curing agent described above, mixing a vinyl modified epoxy ester resin and a blocked isocyanate compound described hereinbelow homogeneously at the molecular level, and causing this to become aqueous, an organic composite plated steel plate can be obtained which has particularly superior rust resistance.

The aqueous resin composition containing an aqueous vinyl modified epoxy ester resin in which a blocked isocyanate compound is mixed homogeneously at the molecular level, which provides superior rust resistance, can be obtained by means of the following preparation.

That is to say, first, while heating and agitating an aromatic epoxy resin and a fatty acid, these are subjected to an esterification reaction for a period within a range of 2 to 10 hours at a temperature within a range of approximately 150° to 250° C., the obtained material is then dissolved in an appropriate organic solvent, and a vinyl monomer having as an essential component thereof an ethylenic vinyl monomer containing a carboxylic group and a polymerization initiator are added, then this is heated and agitated at a temperature within a range of approximately 50° C. to 150° C. in order to conduct a grafting reaction, and a vinyl modified epoxy ester resin is obtained as the reaction product thereof.

Next, the carboxylic groups in the obtained vinyl modified epoxy ester resin are neutralized using a basic compound, and a blocked isocyanate compound is mixed thereinto conplately.

After this, by means of dispersing this in water, an objective aqueous resin composition containing an aqueous vinyl modified epoxy ester resin in which the blocked isocyanate compound is mixed homogeneously at the molecular level, is obtained.

The operation of mixing uniformly on the molecular level which is referred to here indicates, concretely, an operation comprising a series of processes including a mixing of the neutralized product with a blocked isocyanate compound either in the presence of an organic solvent or in the absence of the solvent, and then dispersing the mixture in water.

That is to say, it is necessary to mix the blocked isocyanate compound, in advance of making the reaction products aqueous, after a part or all of the carboxylic groups present in the reaction product are neutralized using a basic substance.

By means of conducting these processes, it is possible to conduct a uniform mixing at the molecular level, and it is possible to obtain an aqueous resin composition in a form in which the vinyl modified epoxy ester resin and the blocked isocyanate compound are both present in the same dispersed particles.

With respect to the method by means of which the neutralized product of the reaction product is dispersed in water, as described above, it is possible to add water while agitating the neutralized product, and to conduct phase inversion emulsification, or to add the reaction product into sufficiently agitated water.

Additionally, a method in which dispersion in water is conducted while applying mechanical shearing force, or in which ultrasonic is applied, may also be adopted.

In this manner, it is possible to prepare an aqueous resin composition containing an aqueous vinyl modified epoxy ester resin in which a blocked isocyanate compound which is an essential component of the aqueous resin composition is mixed homogeneously at the molecular level, which has particularly superior rust resistance, and which is employed in the present invention.

With respect to the aqueous resin composition which is used in the present invention and which is particularly superior in rust resistance, it is also possible to concomitantly use a composition containing, in addition to the aqueous vinyl modified epoxy ester resin into which a blocked isocyanate compound is homogeneously mixed at the molecular level, if necessary, a curing agent for curing this aqueous vinyl modified epoxy ester resin, and/or a powder or a colloid (sol) of a specified metallic oxide for the purpose of increasing the corrosion resistance.

The resin composition for coating material for chromate-coated alloy-plated steel plates which have superior rust resistance which is preferably used in the present invention comprises, respectively:

100 parts per weight of an aqueous vinyl modified epoxy ester resin containing a blocked isocyanate compound (A-2) which is obtained by modifying an epoxy ester resin, obtained by reacting an aromatic epoxy ester resin with a fatty acid, by means of the addition reaction of a vinyl monomer having as an essential component thereof an ethylenic vinyl monomer containing a carboxylic group, and mixing the resulting vinyl modified epoxy ester resin with a blocked isocyanate compound homogeneously on the molecular level so as to make aqueous;

approximately 10 parts per weight to 100 parts per weight of at least one powder or colloid (sol) (B) of $SiO_2$, $Cr_2O_3$, $Fe_2O_3$, $Fe_3O_4$, MgO, $ZrO_2$, $SnO_2$, $Al_2O_3$, or $Sb_2O_5$;

if necessary, 0 to 50 parts per weight of a curing agent (C); and if necessary, 0 to 50 parts per weight of a pigment (D).

In this manner, an aqueous resin composition which is used in the present invention can be obtained. In the organic composite-plated steel plate in accordance with the present invention, the amount of organic coating film comprising this aqueous resin composition should preferably be within a range of approximately 0.2 g/m² to 3.0 g/m². If the amount of organic coating film is less than 0.2 g/m², then it becomes difficult to guarantee the post-working bare corrosion resistance, while on the other hand, when the amount thereof exceeds 3.0 g/m², the electro deposition coating property and the like becomes inferior, and as a result, it becomes impossible to guarantee an electro-deposited coating film possessing superior shininess and the like.

In the aqueous resin composition, it is possible to blend into the aqueous resin composition, in addition to pigments or aqueous pigment compositions, and all the components described above, various commonly-known additives such as, if necessary, plasticizer, emulsion or styrene-butadiene-type latex, other aqueous resins, or silane coupling agents which provide improved adhesion, which are commonly used in coating materials.

In executing the present invention, the aqueous resin composition may be applied by means of various methods such as dipping coating, shower coating, electro-deposition coating, brush coating, spray coating, or roll coating or the like, and cured after coating.

It is preferable that the target organic composite-plated steel plate be obtained by curing at a temperature of approximately 100° C. or more and for a freely selected period of time.

The organic composite-plated steel plate in accordance with the present invention exhibits extremely superior effects in an organic composite-plated steel plate applied to use as a steel plate for automobiles and the like which is produced by means of executing a succeeding electro-deposition coating.

The organic composite-plated steel plate obtained by the present invention has superior adhesion with the adhesives, has superior continuous weldabilities, superior corrosion resistance after working, and superior electro-deposition coating properties, and moreover, has superior coating material adhesion and corrosion resistance, and the coated surface after electro-deposition coating has superior shininess (smoothness), and furthermore, when an aqueous resin composition in which a blocked isocyanate compound and a vinyl modified epoxy ester resin are mixed homogeneously on the molecular level is used, the rust resistance is particularly superior.

Next, an explanation will be given of the evaluation methods of the main characteristics of the organic composite-plated steel plate obtained by the present invention; furthermore, the evaluation standards for the various characteristics are as given below.

That is to say, first, in the evaluation method for shininess and coating material adhesion, electro-deposition coating was conducted so as to produce a 20 micron (µm) coating film using commercially-available electro-deposition coating materials, and this was baked at a temperature of 175° C., and then the shininess thereof was evaluated.

The shininess was measured using a PGD for electro-depositted coating film. Evaluation standards are shown in Table 1.

With respect to the coating material adhesion, after electro-deposition coating, an intermediate coat and a finish coat of 40 microns (µm) each were executed using a melamine-alkyd resin-type coating material, and this was drawn in accordance with JIS K-5400, and an Erichsen cross-cut adhesion test was conducted.

Furthermore, after coating, a sample which had been immersed for a period of 240 hours in water at a temperature of 50° C. was similarly subjected to evaluation. That is to say, this evaluated coating material adhesion after the hot water test. The evaluation standards for this coating material adhesion are as shown in Table 2.

TABLE 1

| Evaluation Index | PGD |
| --- | --- |
| ⊙ | 0.6 or more |
| ○ | less than 0.6~0.5 |
| Δ | less than 0.5~0.4 |
| × | less than 0.4~0.3 |
| ×× | less than 0.3~0.0 |

TABLE 2

| Evaluation Index | Surface Area of Peeled Film |
| --- | --- |
| ⊙ | 0% |
| ○ | 0~1% |
| Δ | 1~10% |
| × | 10%~50% |
| ×× | 50% or more |

Furthermore, the post-working bare corrosion resistance was evaluated by first press-working a sample plate, and then evaluating the corrosion resistance of the press-worked part; this corrosion resistance was evaluated by means of a salt spray testing method conducted in accordance with the stipulations of JIS Z-2371, in which the conditions were such that the sodium chloride concentration was 5 weight percent, the temperature within the vessel was 35° C., and the spray pressure was 20 PSI.

The presence or absence of rust after a period of 5,000 hours exposure and the degree of rust generation were investigated, and an evaluation was conducted based on the surface area in which rust occurred; the evaluation standards are shown in Table 3.

TABLE 3

| Evaluation Index | Rust Formation Ratio |
|---|---|
| ⊙ | 0% |
| ○ | 0~1% |
| △ | 1~10% |
| × | 10~50% |
| ×× | 50% or more |

Herein, first, the adhesion with the adhesives consists of the tensile shearing adhesive strength and the peeling adhesive strength, and these were evaluated in accordance with the stipulations of JIS K-6850 and JIS K-6854 on the basis of the evaluation standards shown in Tables 4 and 5.

TABLE 4

| Evaluation Index | Tensile Shearing Adhesive Strength |
|---|---|
| ⊙ | more than 150 kg/cm$^2$ |
| ○ | 100~150 kg/cm$^2$ |
| △ | 50~100 kg/cm$^2$ |
| × | 30~50 kg/cm$^2$ |
| ×× | less than 30 kg/cm$^2$ |

TABLE 5

| Evaluation Index | Peeling Adhesive Strength |
|---|---|
| ⊙ | more than 15 kg/cm$^2$ |
| ○ | 10~15 kg/cm$^2$ |
| △ | 5~10 kg/cm$^2$ |
| × | 3~5 kg/cm$^2$ |
| ×× | less than 3 kg/cm$^2$ |

Next, with respect to continuous weldabilities, welding was conducted using CF-type electrodes comprising a Cu-Cr material, wherein the conditions were such that the welding force was 250 kgf, and the welding time was 0.2 seconds. With respect to the welding current, the current at which dust generates, and the current at which fusing occurs, were measured, currents within the range between the above two current value were defined as appropriate welding current, and the intermediate value of this appropriate welding current range [(current at which dust generates+current at which rising occurs)×½] was established as the welding current, and continuous welding was conducted within this welding current.

Furthermore, at every 100 points, the nugget diameter was measured, and the number of points passed until the nugget diameter reached 5 mm was evaluated based on the evaluation standards shown in Table 6.

TABLE 6

| Evaluation Index | Continuous Points |
|---|---|
| ⊙ | more than 5,000 points |
| ○ | 3,000 points~5,000 points |
| △ | 1,000 points~3,000 points |
| × | 500 points~1,000 points |
| ×× | 300 points or fewer |

Furthermore, with respect to rust resistance, a 1-cycle operation consisted of immersing a sample in a 5 weight percent aqueous solution of sodium chloride which was saturated with iron rust for a period of 15 minutes, and this was then dried for 15 minutes; the state of rust occurrence was visually evaluated at a point in time after this operation had been repeatedly conducted for 200 cycles, and the evaluation was conducted based on the evaluation standard shown in Table 7.

TABLE 7

| Evaluation Index | Rust Formation Ratio |
|---|---|
| ⊙ | more than 5,000 points |
| ○ | 3,000 points~5,000 points |
| △ | 1,000 points~11,000 points |
| × | 500 points~1,000 points |
| ×× | 300 points or fewer |

(EXAMPLES)

Next, the present invention will be explained in detail based on reference examples, Examples, and Comparative Examples; however, the present invention is not limited to these examples insofar as the technological concept thereof is not deviated therefrom. Unless otherwise limited, the parts and percentages all refer to a weight standard.

[Reference Example 1] [Preparation Example of Aqueous Vinyl Modified Epoxy Ester Resin (A-1)]

60 parts of a dehydrogenated castor oil fatty acid, 60 parts of a soybean oil fatty acid, 30 parts of a safflower oil fatty acid, 225 parts of "EPICLON 1050" (trade name; produced by Dainippon Ink and Chemicals Inc.), and 0.2 parts of dimethyl benzyl amine were charged in a clean reaction vessel equipped a temperature regulator and an agitator under nitrogen gas flow, the temperature thereof was raised to 180° C., reaction was conducted for one hour, the temperature was then further raised to 230° C., and reaction was continued until an acid value reached to 10.

Next, after this was cooled to 100° C., 250 parts of butyl cellosolve were charged, then the temperature thereof was raised to 120° C. while sufficiently agitating, and thereinto, taking over a period of 4 hours, were charged 50 parts of methacrylic acid, 33 parts of acrylic acid, 25 parts of 2-hydroxyethyl acrylate, 25 parts of 2-hydroxyethyl methacrylate, and 25 parts of tert-butyl peroxide, and this was then allowed to maintain for 4 hours.

After this was then cooled to a temperature of 50° C., 110 parts of triethyl amine were added while well agitating, and 440 parts of de-ionized water were charged thereinto, and a milk-white objective resin liquid having a 40% non-volatile component was obtained. Hereinbelow, this is referred to as "resin (A-1-1)".

In this resin (A-1-1), the proportion of aromatic epoxy resin and fatty acid is 60:40 (weight ratio, hereinbelow identical), and with respect to the amounts of whole ethylenic vinyl monomer and ethylenic vinyl monomer containing carboxylic groups, these were, respectively, 35.5 parts and 22.1 parts with respect to 100 parts of the reaction product of the aromatic epoxy resin and the fatty acid.

[Reference Example 2] (As above)

75 parts of dehydrogenated castor oil fatty acid, 75 parts of soybean oil fatty acid, 75 parts of safflower oil fatty acid, 150 parts of "EPICLON 1050", and 0.2 parts of dimethyl benzyl amine were placed in a clean reaction vessel which was equipped a temperature regulator and an agitator under a nitrogen gas flow, the temperature thereof was raised to 180° C., and a reaction was carried out for a period of 1 hour, the temperature was then further raised to 230° C., and the reaction was continued until an acid value reached to 5.

After this was then cooled to a temperature of 100° C., 250 parts of butyl cellosolve were added, the temperature was raised to 120° C. while sufficiently agitating, and thereinto were charged, taking over a period of 4 hours, 40 parts of acrylic acid, 25 parts of 2-hydroxyethyl acrylate, 25 parts of styrene, and 20 parts of tert-butyl peroxide, and this was allowed to maintain for a period of 4 hours.

After cooling to 50° C., 60 parts of triethyl amine were added, and 417.5 parts of de-ionized water were charged thereinto while sufficiently agitating, and the objective resin liquid, which was milk-white and had 40% non-volatile components, was obtained. Hereinbelow, this is termed "resin (A-1-2)".

In this resin (A-1-2), the proportion of aromatic epoxy resin and fatty acid was 40:60, and the amounts of whole ethylenic vinyl monomer and ethylenic vinyl monomer containing carboxylic groups which were used were, respectively, 24 parts and 10.5 parts, with respect to 100 parts of the reaction product of the aromatic epoxy resin and the fatty acid.

[Reference Example 3] [Preparation Example of Aqueous Vinyl Modified Epoxy Ester Resin (A-2)]

60 parts of dehydrogenated castor oil fatty acid, 60 parts of soybean oil fatty acid, 30 parts of safflower oil fatty acid, 225 parts of "EPICLON 1050", and 0.2 parts of dimethyl benzyl amine were placed under a nitrogen gas flow in a clean reaction vessel which was equipped a temperature regulator and an agitator, the temperature was raised to 180° C., a reaction was carried out for a period of 1 hour, the temperature was further raised to 230° C., and reaction was carried out until an acid value reached to 10.

Next, after this was cooled to a temperature of 100° C., 250 parts of butyl cellosolve were added, then the temperature thereof was raised to 120° C. while sufficiently agitating, and thereinto was charged, taking over a period of 4 hours, 50 parts of acrylic acid, 25 parts of 2-hydroxyethyl acrylate, and 10 parts of tert-butyl peroxide, and this was then allowed to maintain for a period of 4 hours.

Then the temperature was cooled to 50° C., and 77 parts of triethyl amine were added, and this was sufficiently agitated. Next, 30 parts of a hexamethylene diisocyanate-methylethyl ketoxime-blocked substance was added as a blocked isocyanate compound, and this was sufficiently mixed for a period of 30 minutes.

After this, 408 parts of de-ionized water were charged thereinto, while conducting agitation, and the objective resin liquid, which was milk-white in color and which had 40% non-volatile components, and in which a blocked isocyanate compound and vinyl modified epoxy ester resin were mixed on the molecular level, was obtained. Hereinbelow, this is termed "resin (A-2-1)".

In this resin (A-2-1), the proportion of aromatic epoxy resin and fatty acid was 60:40, and the amounts of whole ethylenic vinyl monomer and ethylenic vinyl monomer containing carboxylic groups were, respectively, 20 parts and 13.3 parts, with respect to 100 parts of the reaction product of the aromatic epoxy resin and the fatty acid. Furthermore, the proportion of blocked isocyanate compound contained was 6% of the solid component of resin (A-2-1).

(Examples 1~9 and Comparative Examples 1~5)

The resin liquids obtained in Reference Examples 1~3 were blended in the proportions shown in Table 8 (shown in solid component proportions), and various resin compositions for coating materials for chromate-coated alloy-plated steel plates were prepared.

In Table 8, in the "Type of Resin" column, reference A indicates the resin (A-1-1) obtained in Reference Example 1, reference B indicates the resin (A-1-2) obtained in Reference Example 2, and reference C indicates the resin (A-2-1) obtained in Reference Example 3.

A commercially-available carboxylated polyethylenic emulsion (X) and an aromatic epoxy emulsion (Y) were employed as comparative examples. Furthermore, as the curing agents, a hexamethylene diisocyanate-methylethyl ketoxime-blocked substance which was made aqueous using a non-ionic dispersant ($\alpha$), a diphenyl methane diisocyanate-methylethyl ketoxime-blocked substance which was made aqueous using a non-ionic dispersant ($\beta$), and "CYMEL 303" (trade name: produced by Mitsui SciTech) ($\gamma$) were employed.

Furthermore, with respect to the powders or colloids (sols) of metallic oxides, an aqueous dispersion (M1) of $SiO_2$ having an average particle diameter of 10 nm, an aqueous dispersion (M2) of $Cr_2O_3$ having an average particle diameter of 8 nm, and $Al_2O_3$ (M3) having an average particle diameter of 6 nm, were employed.

Furthermore, with respect to the pigment, an aqueous pigment (produced by Dainippon Ink and Chemicals, Inc.) was employed in which an azoleic pigment was dispersed by using a non-ionic dispersant.

TABLE 8 (1-1)

|  |  | Example 1 | Example 2 | Example 3 |
|---|---|---|---|---|
| Type of Resin | A | 100 | 100 | 100 |
| Type of Curing Agent | $\alpha$ | 10 | | |
|  | $\beta$ | | 20 | |
|  | $\gamma$ | | | 5 |
| Metallic Colloid | M1 | 20 | | |
|  | M2 | | 50 | |
|  | M3 | | | 30 |
| Aqueous Pigment | | | | 5 |
| Type of Plating | | Zn—Ni | Zn—Ni | Zn—Ni |
| Amount of Majour Metal | | 87.2 | 87.2 | 86.5 |
| Amount of Minor Metal | | Ni = 12.8 | Ni = 12.8 | Ni = 13.5 |
| Amount of Plating Film | | 20 | 20 | 20 |

[Notes for Table 8]

The reference to the "Amount of Majour Metal" in the Table indicates "the amount of Majour metal (Zn) contained in the plating"; and the value is indicated by weight percent.

In the Table, the reference to the "Amount of Minor Metal" indicates the name of the metal in question, and also displays the percentage of the metal contained (weight percent).

In the Table, the units for the "Amount of Plating Film" are $g/m^2$.

TABLE 8 (1-2)

|  | Example 1 | Example 2 | Example 3 |
|---|---|---|---|
| Type of Chromate | Electrolytic | Applied | Reactive |
| Amount of Chromate Film | 85 | 48 | 48 |
| Amount of Inorganic/Organic Composite Film | 0.5 | 0.4 | 0.6 |
| Adhesion with Adhesive | ⊚ | ⊚ | ⊚ |
| Continuous Weldabilities | ⊚ | ⊚ | ⊚ |
| Post-Working Bare Corrosion Resistance | ⊚ | ⊚ | ⊚ |
| Electro-deposition Coating Properties | ⊚ | ⊚ | ⊚ |
| Coating Material Adhesion Properties (1) | ⊚ | ⊚ | ⊚ |
| Coating Material Adhesion Properties (2) | ⊚ | ⊚ | ⊚ |
| Corrosion Resistance | ⊚ | ⊚ | ⊚ |
| Shininess | ⊚ | ⊚ | ⊚ |
| Rust Resistance | ○ | ○ | ○ |

[Notes for Table 8]

The units of the "Amount of Chromate Coating film" in the Table are mg/m$^2$.

The units of the "Amount of Inorganic/Organic Composite Film" in the Table are g/m$^2$.

In the Table, the reference to the "Coating Material Adhesion Properties (1)" indicates the coating material adhesion in the normal state, while "Coating Material Adhesion Properties (2)" indicates the coating material adhesion after the hot water test.

TABLE 8 (2-1)

|  |  | Example 4 | Example 5 | Example 6 |
|---|---|---|---|---|
| Type of Resin | A | 100 |  |  |
|  | B |  | 100 |  |
|  | C |  |  | 100 |
| Type of Curing Agent | α | 15 | 10 |  |
| Metallic Colloid | M1 | 40 |  | 20 |
|  | M2 |  | 20 |  |
| Aqueous Pigment |  |  | 5 |  |
| Type of Plating |  | Zn—Ni | Zn—Mn | Zn—Ni— |
| Amount of Majour Metal |  | 85.9 | 58 | 86.9 |
| Amount of Minor Metal |  | Ni = 14.1 | Mn = 42 | Ni = 12.1 Co = 1.0 |
| Amount of Plating Film |  | 20 | 25 | 20 |

[Notes for Table 8]

In the Table, the "Zn-Ni-" shown for Example 5 is a shortened form of "Zn-Ni-Co".

TABLE 8 (2-2)

|  | Example 4 | Example 5 | Example 6 |
|---|---|---|---|
| Type of Chromate | Applied | Electrolytic | Electrolytic |
| Amount of Chromate Film | 43 | 41 | 85 |
| Amount of Inorganic/Organic Composite Film | 0.6 | 0.8 | 1.3 |
| Adhesion with Adhesive | ⊚ | ⊚ | ⊚ |
| Continuous | ⊚ | ⊚ | ⊚ |

TABLE 8 (2-2)-continued

|  | Example 4 | Example 5 | Example 6 |
|---|---|---|---|
| Weldabilities |  |  |  |
| Post-Working Bare Corrosion Resistance | ⊚ | ⊚ | ⊚ |
| Electro-deposition Coating Properties | ⊚ | ⊚ | ⊚ |
| Coating Material Adhesion Properties (1) | ⊚ | ⊚ | ⊚ |
| Coating Material Adhesion Properties (2) | ⊚ | ⊚ | ⊚ |
| Corrosion Resistance | ⊚ | ⊚ | ⊚ |
| Shininess | ⊚ | ⊚ | ⊚ |
| Rust Resistance | ○ | ○ | ⊚ |

TABLE 8 (3-1)

|  |  | Example 7 | Example 8 | Example 9 |
|---|---|---|---|---|
| Type of Resin | C | 100 | 100 | 100 |
| Type of Curing Agent | β |  | 5 |  |
| Metallic Colloid | M1 | 50 |  |  |
|  | M2 |  | 50 | 20 |
| Aqueous Pigment |  |  |  | 10 |
| Type of Plating |  | Zn—Cr | Zn—Fe | Zn—Al |
| Amount of Majour Metal |  | 88.5 | 89 | 95 |
| Amount of Minor Metal |  | Cr = 11.5 | Fe = 11.0 | Al = 5 |
| Amount of Plating Film |  | 20 | 23 | 45 |

TABLE 8 (3-2)

|  | Example 7 | Example 8 | Example 9 |
|---|---|---|---|
| Type of Chromate | Applied | Applied | Electrolytic |
| Amount of Chromate Film | 52 | 38 | 75 |
| Amount of Inorganic/Organic Composite Film | 1.1 | 1.5 | 1.5 |
| Adhesion with Adhesive | ⊚ | ⊚ | ⊚ |
| Continuous Weldabilities | ⊚ | ⊚ | ⊚ |
| Post-Working Bare Corrosion Resistance | ⊚ | ⊚ | ⊚ |
| Electro-deposition Coating Properties | ⊚ | ⊚ | ⊚ |
| Coating Material Adhesion Properties (1) | ⊚ | ⊚ | ⊚ |
| Coating Material Adhesion Properties (2) | ⊚ | ⊚ | ⊚ |
| Corrosion Resistance | ⊚ | ⊚ | ⊚ |
| Shininess | ⊚ | ⊚ | ⊚ |
| Rust Resistance | ⊚ | ⊚ | ⊚ |

Next, the various chromate coating films shown in FIG. 9 were formed on plated steel plates having the deposited amounts and plate compositions shown in Table 9, and the resin compositions for coating materials for chromate-coated alloy-plated steel plates shown above were applied, and these were dried and cured for a period of 10 seconds at a temperature of 150° C. The results of the evaluations of the organic composite-plated steel plates obtained in this manner are also compiled and shown in the same Table.

TABLE 9 (1-1)

|  |  | Comparative Example 1 | Comparative Example 2 | Comparative Example 3 |
|---|---|---|---|---|
| Type of Resin | X | 100 | 100 |  |
|  | Y |  |  | 100 |
| Type of Curing Agent | α | 30 |  | 10 |
|  | β |  | 20 |  |
| Metallic Colloid | M1 | 50 |  | 30 |
|  | M2 |  | 30 |  |
| Type of Plating |  | Zn—Ni | Zn—Ni | Zn—Ni |
| Amount of Majour Metal |  | 87.4 | 89.2 | 85.8 |
| Amount of Minor Metal |  | Ni = 12.6 | Ni = 10.8 | Ni = 14.2 |
| Amount of Plating Film |  | 20 | 20 | 20 |

TABLE 9 (1-2)

|  | Comparative Example 1 | Comparative Example 2 | Comparative Example 3 |
|---|---|---|---|
| Type of Chromate | Electrolytic | Applied | Reactive |
| Amount of Chromate Film | 75 | 48 | 56 |
| Amount of Inorganic/Organic Composite Film | 0.8 | 1.2 | 1.7 |
| Adhesion with Adhesive | × | × | ⊙ |
| Continuous Weldabilities | ⊙ | ⊙ | × |
| Post-Working Bare Corrosion Resistance | ⊙ | ⊙ | × |
| Electro-deposition Coating Properties | × | × | × |
| Coating Material Adhesion Properties (1) | × | × | ⊙ |
| Coating Material Adhesion Properties (2) | × | × | ⊙ |
| Corrosion Resistance | ○ | ○ | ⊙ |
| Shininess | × | × | × |
| Rust Resistance | × | × | × |

TABLE 9 (2-1)

|  |  | Comparative Example 4 | Comparative Example 5 |
|---|---|---|---|
| Resin Type | Y | 100 | 100 |
| Type of Curing Agent | β | 10 |  |
|  | γ |  | 15 |
| Metallic Colloid | M2 | 30 |  |
|  | M3 |  | 20 |
| Type of Plating |  | Zn—Ni | Zn—Ni |
| Amount of Majour Metal |  | 86.9 | 88.2 |
| Amount of Minor Metal |  | Ni = 13.1 | Ni = 11.8 |
| Amount of Plating Film |  | 20 | 20 |

TABLE 9 (2-2)

|  | Comparative Example 4 | Comparative Example 5 |
|---|---|---|
| Type of Chromate | Electrolytic | Applied |
| Amount of Chromate Film | 82 | 42 |
| Amount of Inorganic/Organic Composite Film | 0.7 | 1.3 |
| Adhesion with Adhesive | ⊙ | ⊙ |
| Continuous Welding Properties | × | × |
| Post-Working Bare Corrosion Resistance | × | × |
| Electro-deposition Coating Properties | × | × |
| Coating Material Adhesion Properties (1) | ⊙ | ⊙ |
| Coating Material Adhesion Properties (2) | ⊙ | ⊙ |
| Corrosion Resistance | ⊙ | ⊙ |
| Shininess | × | × |
| Rust Resistance | × | × |

INDUSTRIAL APPLICABILITY

The organic composite-plated steel plate obtained in accordance with the present invention described above has superior adhesion with adhesives, superior continuous welding properties, superior post-working corrosion resistance, and superior electro-deposition coating properties, and moreover, has superior coating material adhesion, and corrosion resistance, and the coated surface thereof, after electro-deposition coating, has particularly superior shininess (smoothness), and furthermore, when an aqueous resin composition is employed in which a blocked isocyanate compound and a vinyl modified epoxy ester resin are homogeneously mixed on the molecular level, the resulting steel plate has superior rust resistance, so that in particular, by carrying out successive electro-deposition coating, the steel plate which is obtained exhibits extremely superior effects as an organic composite plated steel plate which is adapted for use as a steel plate for use in automobiles and the like.

We claim:

1. An improved organic composite-plated steel plate, obtained by applying a thermosetting resin to a chromate-coated alloy-plated steel plate and curing said thermosetting resin, wherein an aqueous resin composition containing, as a necessary coating film formation component, an aqueous vinyl modified epoxy ester resin which is obtained by modifying an epoxy ester resin having a molecular weight of 80 to 6000, obtained by reacting an aromatic epoxy resin and a fatty acid, by means of an addition reaction with a vinyl monomer having as a necessary component an ethylenic vinyl monomer containing carboxylic groups, and neutralizing said modified epoxy ester resin using a basic compound, is used as said thermosetting resin.

2. An improved organic composite-plated steel plate, obtained by applying a thermosetting resin to a chromate-coated alloy-plated steel plate and curing said thermosetting resin, wherein an aqueous resin composition comprising: an aqueous vinyl modified epoxy ester resin which is obtained by modifying an epoxy ester resin having a molecular weight of 80 to 6000, obtained by reacting an aromatic epoxy resin and a fatty acid, by means of an addition reaction with a vinyl monomer having as a necessary component an ethylenic vinyl monomer containing carboxylic groups, and neutralizing said modified epoxy ester resin using a basic compound; and a curing agent for said aqueous vinyl modified epoxy ester resin, is used as said thermosetting resin.

3. An improved organic composite-plated steel plate, obtained by applying a thermosetting resin to a chromate-coated alloy-plated steel plate and curing said thermosetting resin, wherein an aqueous resin composition comprising:

an aqueous vinyl modified epoxy ester resin which is obtained by modifying an epoxy ester resin having a molecular weight of 80 to 6000, obtained by reacting an aromatic epoxy resin and a fatty acid, by means of an addition reaction with a vinyl monomer having as a necessary component an ethylenic vinyl monomer containing carboxylic groups, and neutralizing said modified epoxy ester resin using a basic compound; and at least one selected from the group consisting of a powder and colloid (sol) comprising at least one of $SiO_2$, $Cr_2O_3$, $Fe_2O_3$, $Fe_3O_4$, MgO, $ZrO_2$, $SnO_2$, $Al_2O_3$, and $Sb_2O_5$, is used as said thermosetting resin.

4. An improved organic composite-plate steel plate, obtained by applying a thermosetting resin to a chromate-coated alloy-plated steel plate and curing said thermosetting resin, wherein an aqueous resin composition comprising:

an aqueous vinyl modified epoxy ester resin which is obtained by modifying an epoxy ester resin having a molecular weight of 80 to 6000, obtained by reacting an aromatic epoxy resin and a fatty acid, by means of an addition reaction with a vinyl monomer having as a necessary component an ethylenic vinyl monomer containing carboxylic groups, and neutralizing the modified epoxy ester resin using a basic compound;

a curing agent; and at least one member selected from the group consisting of a powder and a colloid (sol) comprising at least one of $SiO_2$, $Cr_2O_3$, $Fe_2O_3$, $Fe_3O_4$, MgO, $ZrO_2$, $SnO_2$, $Al_2O_3$, and $Sb_2O_5$, is used as said thermosetting resin.

5. An improved organic composite-plated steel plate in accordance with one of claims 2 and 4, wherein said aqueous vinyl modified epoxy ester resin and curing agent are obtained by mixing homogeneously, on the molecular level, a vinyl modified epoxy ester resin and a blocked isocyanate compound, so as to be aqueous.

6. An organic composite-plated steel plate, wherein an amount of an organic coating film obtained by applying an aqueous resin composition in accordance with one of claims 1 through 4, and curing said aqueous resin composition, is within a range of 0.2 to 3.0 g/m$^2$.

7. An improved organic composite-plated steel plate in accordance with claim 5, wherein an amount of an organic coating film obtained by applying an aqueous resin composition obtained by, prior to said modifying of said epoxy ester resin by said addition reaction of said vinyl monomer in accordance with claim 2, mixing said vinyl modified epoxy ester resin and a blocked isocyanate compound homogeneously on a molecular level so as to be aqueous, and curing said aqueous resin composition, is within a range of 0.2 to 3.0 g/m$^2$.

8. An improved organic composite-plated steel plate in accordance with claim 5, wherein an amount of an organic coating film obtained by applying an aqueous resin composition obtained by, prior to said modifying of said epoxy ester resin by said addition reaction of said vinyl monomer in accordance with claim 4, mixing said vinyl modified epoxy ester resin and a blocked isocyanate compound homogeneously on a molecular level so as to be aqueous, and curing said aqueous resin composition, is within a range of 0.2 to 3.0 g/m$^2$.

* * * * *

UNITED STATES PATENT AND TRADEMARK OFFICE
CERTIFICATE OF CORRECTION

PATENT NO.    : 5,637,403
DATED         : Jun. 10, 1997
INVENTOR(S)   : Kuwamura et al.

It is certified that error appears in the above-identified patent and that said Letters Patent is hereby corrected as shown below:

Column 22,   line 61, "80" should read --800--.

Column 23,   line 8, "80" should read --800--;
             line 24, "80" should read --800--;
             line 42, "80" should read --800--.

Signed and Sealed this

Twenty-second Day of September, 1998

Attest:

BRUCE LEHMAN

*Attesting Officer*      Commissioner of Patents and Trademarks